United States Patent

[11] 3,554,551

[72] Inventor Sylvester K. Apiki
2226 Tantalus Drive, Honolulu, Hawaii 96813
[21] Appl. No. 815,619
[22] Filed Apr. 14, 1969
[45] Patented Jan. 12, 1971

[54] BALL FIELD AND PLAYING APPARATUS
5 Claims, 6 Drawing Figs.
[52] U.S. Cl. .................................... 273/95,
273/106, 273/1, 273/102.1, 273/72
[51] Int. Cl. .................................... A63b 67/00
[50] Field of Search .................................... 273/25, 56,
60, 72, 83, 88, 95, 106, 129, 102.1C

[56] References Cited
UNITED STATES PATENTS
442,675  12/1890  Wilcox ........................ (273/106UX)
969,424  9/1910  Tilmes & Kallmeyer ..... 273/88
2,683,603  7/1954  Gackenbach ................. 273/25
FOREIGN PATENTS
265,080  8/1926  Great Britain ................ 273/1(C)

Primary Examiner—Anton O. Oechsle
Assistant Examiner—M. S. Siskind
Attorney—Earl E. Moore ABSTRACT: A playing field with a substantially flat surface having an angular form bounded by side lines which taper inwardly to form a corner portion, the corner portion having a batter's position and a wicket structure. A bird and bat are placed at the batter's position, the bird comprising a spoollike element and having a space beneath a central portion to accommodate a prong portion extending from an end of the bat so that a batter can engage the bird and toss it in the air and strike it for a play position on the field.

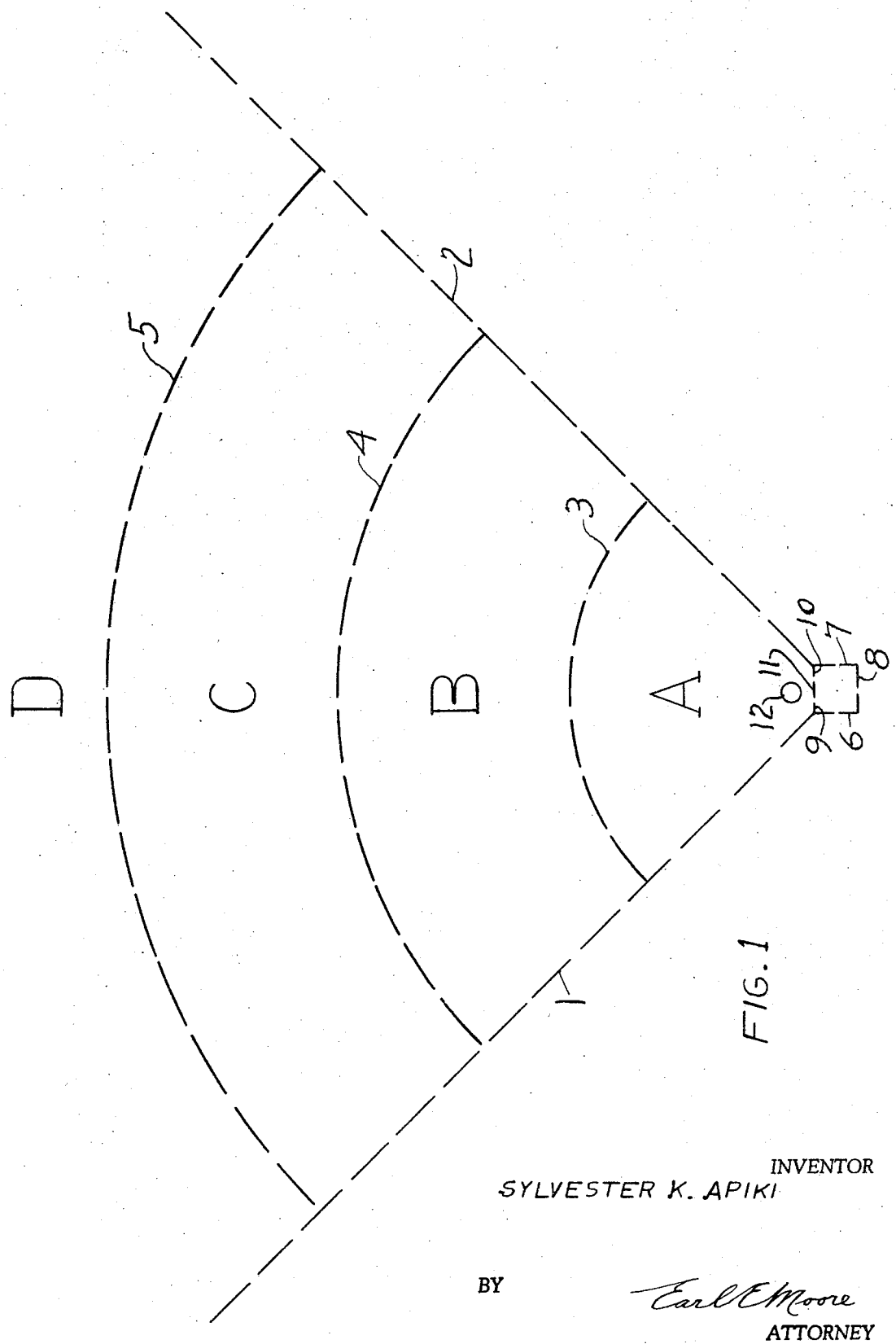

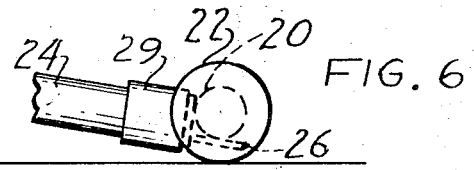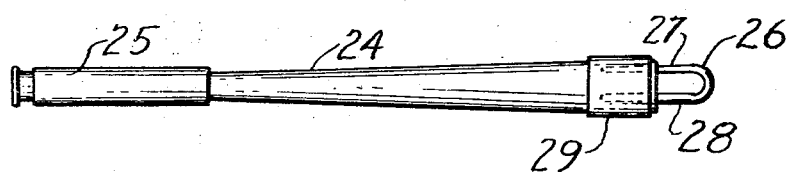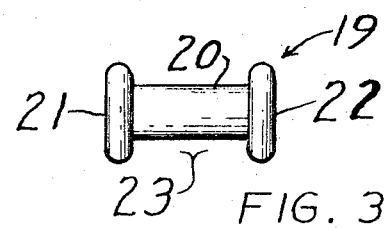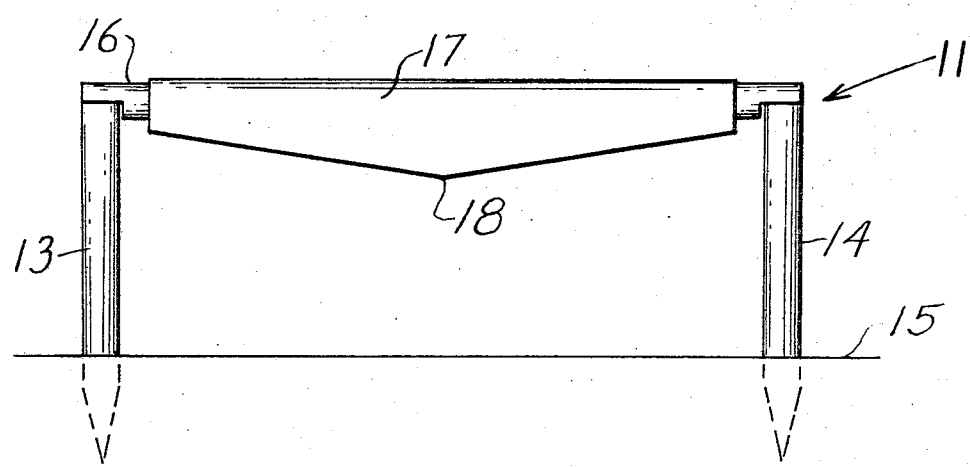

3,554,551

BALL FIELD AND PLAYING APPARATUS

This invention relates to a game that can be played indoors or outdoors. If played indoors, the game is played on a board which is marked the same as the markings on the ground when played outdoors. The play field is an angular one having areas where scores can be made from a batting area. The flight object or missile is called a bird and it must be batted into one of the score areas and a field player picks up the bird, according to the rules, and returns it to the batting area by attempting to knock down a wicket or the like which is a removable bar.

A special wicket means, batting means and bird means are employed. The bat has a projection or extension as a prong, for instance, which is adapted to pass under a portion of the bird so that the bird can be easily lifted and tossed into the air where it can be batted to a distant portion of the field; but if the batter so desires, he can make additional points of score by tapping the bird upwardly from the bat in a manner that might be termed "juggling the bird" and this is done by constantly knocking the bird upward in the air by the bat until the batter is ready to make a final swing to send the bird to one of the scoring areas. A flag is provided on the wicket so that a player in the field can easily and quickly see the wicket and aim the bird to it. The team with the greatest skill will gain the most points of score and thus win the game. The game may be any number of innings, but seven innings is believed sufficient so as not to overtire the players.

The principal object of this invention is to present an amusing game wherein a high degree of skill is required and a game which can be enjoyed by an audience and wherein the assembly of spectators may reach the proportion of those now attending other sports such as football and baseball.

Another object is to provide a game that can be played on a board (a folding board for instance) and thus amuse a pair of contestants who employ toy men of small size as players.

Other objects of this invention can be learned from a perusal of the specification and drawings attached hereto.

IN THE DRAWINGS

FIG. 1 is a plan view of a playing field wherein the field may be a grassy plot of ground or a portable board;

FIG. 2 is an elevational view of a wicket device;

FIG. 3 is an elevational view of a bird;

FIG. 4 is an elevational view of a bat;

fig. 5 is an end elevational view of the bat shown in FIG. 4;

FIG. 6 is an elevational view of one end of the bird showing how the bat engages the bird (only a portion of the bat being shown).

With reference to the drawings, FIG. 1 shows a playing field of a special design which is within the bounds of broken lines, for instance: the side lines 1 and 2 and includes the curved dividing lines 3, 4 and 5 and the side lines of a box indicated at 6 and 7 and a rear line 8. The purpose of the broken lines is to make it easy and economical to form the field by the use of lime or flour when the field is arranged outdoors and of full size. The result is a design as shown in the drawings. The curved lines 3, 4 and 5 provide scoring point areas or districts B C and D and a spacing area A. The area D has no forward bounds except that the extension of the side lines limits the area as to width.

The box formed by lines 6, 7 and 8 have the front portion thereof indicated by lines 9 and 10 which may be termed batter start lines or positions. Between the start lines a wicket device 11 is shown and details thereof are illustrated in FIG. 2. A circle space or plate 12 is provided as a suitable place for a specific purpose to be explained presently.

All the spaces provided need not necessarily be exactly the size they appear to be in the drawings, but it is preferred that the side lines 1 and 2 be at substantially right angles to each other and that the areas A B and C be of such a size as indicated whereby their respective line ends are 50 feet apart when the field is set up outdoors. The box sides should be fifteen feet each and the circle plate 12 about 6 feet in diameter and located where shown.

The wicket device consists of a pair of spaced-apart stakes or pegs 13 and 14 which are driven into the ground 15 about equal distance and present their flat tops to support a removable bar or wicket 16. The ends of this bar are rabbeted so as to provide a flat undersurface to rest neatly upon the tops of the pegs. A bright orange or yellow flag or drape 17 is provided and attached to the bar 16 so that the wicket device can be seen from a distance. The dangling bottom edge of the flag is shown tapered so as to indicate the center portion of the wicket device.

The bird 19 used in this game is shown in FIG. 3. This bird and other parts of the game may be of wood or plastic material and tough enough to withstand the abuse such items must take in such a game. The bird has the general appearance of a spool and has a shaft portion 20 with integral rounded ends 21 and 22. Although the shaft and ends are shown round, they may not necessarily be of such a configuration. It is important that a space 23 be provided which is large enough to easily receive the end portion or prong of a bat to be presently explained in detail.

The bat is indicated at 24 and is of the usual general form of a baseball bat, but shorter, and has the hand grip portion 25. The distal end of the bat has a U-shaped prong or end extension 26 and wherein its legs 27 and 28 are embedded in the bat end for instance, fixed in grooves of the bat end and a ferrulelike wrapping 29 provided to protect the bat end. Obviously, a metal ferrule may be used for the purpose, but in any event, the pickup end of the prong 26 is of sufficient length and so sized that it can reach beneath the shaft 20 of the bird as indicated in FIG. 6 of the drawing. If found advantageous, the exposed portion of the prong may be slightly curved and the very ends of the legs may be sharpened and bent to enter the material of the bat and in this way provide a batter-fixed prong.

The name of the game is PIO and the length of the game may be seven innings. An inning is counted when each of the two teams have one turn at the bat. Each team has a plurality of players, however, in practice, it has been found that seven men in the field is sufficient, therefore, each team should have at least seven men. Obviously, the dimensions of the areas and lines of the field may be varied for ordinary vacant lot playing, but for professional games, the dimensions should be standardized.

BATTING

The batters take turns in rotation until three outs are made. The captain of the team decides how the men are to be listed so that each man gets his turn at the bat. A batter grasps the bat at the handle thereof in either hand and then grasps the shaft of the bird with the other hand. He tosses the bird upwardly and hits it at about its center portion so as to knock the bird as far as possible within the side lines and tries to so place the bird that it is not caught or pushed by the hand of a fielder. If the batter misses the bird on the first swing, he is allowed a second try. The batter stands at either side of the wicket and back of the line 9 or 10.

FIELDING

There are no bases and hence no running by the batter. The fielders should be spread out over the field at strategic points of operation, but no fielder is positioned in the area A. The fielders should try to put the batter out by catching the bird before it hits the ground, but when a safe hit is made, one of the fielders will pick up the bird and try to hit the wicket 16 to displace it (ground it) and thus put the batter out. A fielder is allowed to push the batted bird while in motion by hand only with the object of getting the bird nearer to the wicket.

1. If the bird is pushed outside of the play lines, the batter will place the bird in the circle 12 and then try for points. If the bird is tossed beyond the wicket but within the field of play, the point-try will be made from where the bird stops. If during the point-try the bird is pushed outside of the field it is placed at point of push.

2. If the batter missed the bird on the first try but hits the bird to a safe spot on the second try, the fielders will be entitled to a "kick." One of the fielders then places the bird on but over his toes of either foot and kicks the bird as close as possible to the wicket without passing it; and then by hand he tries to knock down the wicket for a putout. If the bird is kicked outside of the play field, the batter must place the bird in circle 12 and try again for points as aforesaid. But if the bird is kicked over the wicket 11, the batter is entitled to points play from where the bird stops if still within the lines of the box. When trying for a putout, a fielder may throw the bird from the point where it stops or is stopped. If the bird lands near a side line (lines 1 or 2) the fielder may pickup the bird and walk to the center of the field to a spot the same distance from the wicket and there try to dislodge the wicket.

SCORING

After the fielder has failed to putout the batter upon a hit, the batter will then try to score by hitting the bird into a scoring area or zone like B, C or D. This operation requires that the batter place the tip 26 under the shaft 20 of the bird and then to flip the bird upwardly into the air to hit it and knock the bird into one of the scoring areas. If the batter succeeds in knocking the bird safely into area B he gets one point; if he places the bird in area C he gets two points; but in area D he would get five points. Additional points can be made before he knocks the bird into said areas. This is done by tapping the bird straight up to keep it into the air until he decides to knock the bird into one of the scoring areas. Each tap on the bird counts a point (but not the hit which sends the bird into a scoring area) thus the score for the batter would be the number of taps plus the area score. If the batter fails to make a successful tap, that is, he misses, he cannot score.

Each batter will have two tries for scoring. If after the second attempt at scoring in one of the areas, but if there be no scoring and the bird remains in area A the batter scores nothing at all regardless of the number of taps he may have made; however, the batter is not out. A new batter is then positioned at 9 or 10.

OUTS

A batter will be called out by the umpire if:

1. The batter misses the bird on his second try. If the batter hits the bird on the second try and makes a safe landing of the bird, he is penalized for missing the bird on the first try and this penalty is: after the successful second hit, the fielder will have a kick coming and this is done in the manner explained under "Fielding."

2. If the batter knocks the bird outside of the playing field or beyond the side lines 1 and 2 he is out.

3. If the batter throws the bat during batting action, or point-making attempts, he is out.

4. If during battings operations he drops the bird onto the wicket or any part of the bird goes under the wicket, he is out.

5. Fielder catches a fly, the batter is out.

6. Batter makes a safe hit and a fielder returns the bird and hits the wicket or any part of the bird goes under the wicket, the batter is out. If fielder throws the bird at the wicket for a putout and the bird goes outside of the field of play, the batter must pick up the bird and place it in the circle 12 and try for points (fielders are not stationed in the area A).

Certain novel features and details of this invention are disclosed wherein, and in some cases in considerable detail, and this is in order to make the invention clear in at least one form thereof, however, it is to be clearly understood that the invention as disclosed is not necessarily limited to the exact form and details disclosed since it is apparent that various modifications and changes may be made without departing from the spirit and scope of the invention as described and claimed.

I claim:

1. A playing field with a substantially flat surface having an angular form bounded by side lines which taper inwardly to form a corner portion, the corner portion having a marked space for a batter's position, and wicket means at said marked space, a bird and a bat at said marked space, the bird comprising a spoollike element having a space beneath a central portion thereof to accommodate a prong portion extending from an end of the bat so that a batter can engage the bird and toss it into the air and strike it for a play position on the field.

2. The field recited in claim 1 wherein the wicket means is a removable bar spaced above the surface of the field and which is adapted to be knocked to the surface of the field when hit by the bird that is thrown by a fielder, and a flag means supported by the bar which is to be grounded when struck by the bird.

3. The field recited in claim 2 wherein the wicket means is an elongated bar balanced upon a pair of spaced-apart pegs.

4. The field recited in claim 3 wherein a box area is provided back of the wicket means, and a plate in front of the wicket means sized to accommodate a batter.

5. The field recited in claim 4 wherein curved scoring areas are provided in front of and spaced from the wicket means, and wherein the scoring areas have point values when the bird is stopped thereon, and wherein the point values of each scoring area are higher in accordance to their distance from the wicket means.